Feb. 9, 1937.  W. J. MORRILL  2,070,447
ALTERNATING CURRENT MOTOR
Filed Feb. 4, 1936
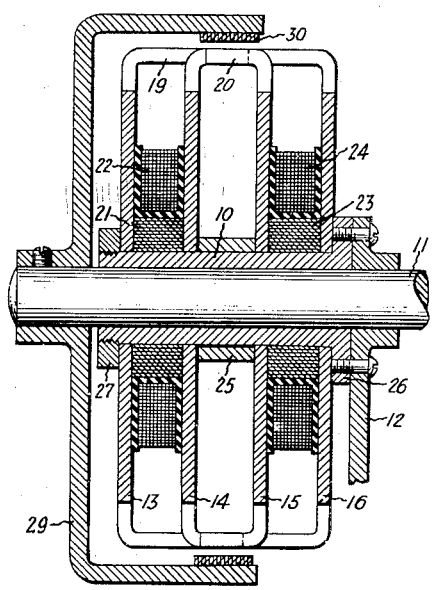
Fig.1.
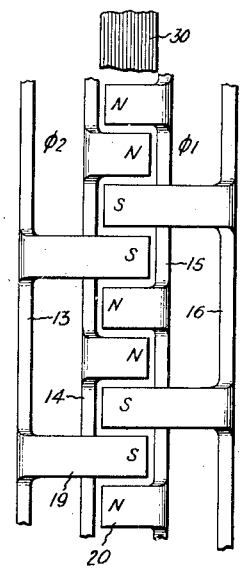
Fig.2.
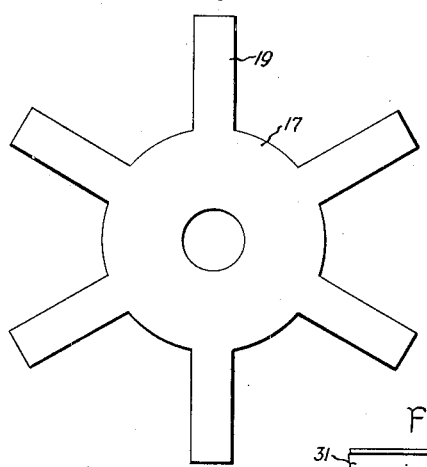
Fig.3.  Fig.4.
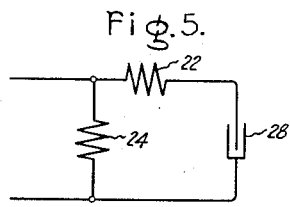
Fig.5.
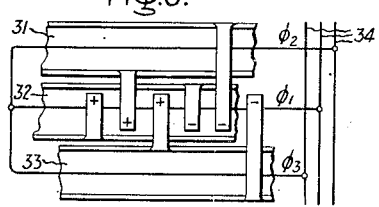
Fig.6.
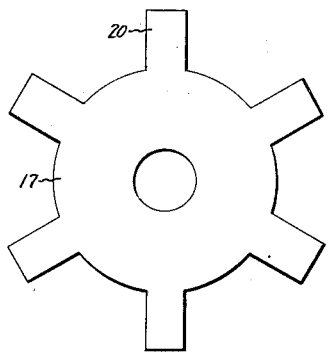
Inventor:
Wayne J. Morrill,
by Harry E. Dunham
His Attorney.

Patented Feb. 9, 1937

2,070,447

UNITED STATES PATENT OFFICE 2,070,447

ALTERNATING-CURRENT MOTOR

Wayne J. Morrill, Fort Wayne, Ind., assignor to General Electric Company, a corporation of New York Application February 4, 1936, Serial No. 62,281

6 Claims. (Cl. 172—278)

My invention relates to polyphase electric motors, such as split-phase and three-phase motors, and its object is to provide a stator construction for this type of motor which is relatively inexpensive and which makes it economically practicable to build polyphase motors for a wide variety of applications in fractional horse-power sizes.

In carrying my invention into effect, I build up the stator of the motor from two or more single-phase stator elements, each energized by a simple single-phase coil and each having two or more pairs of pole pieces of opposite magnetic polarity. The pole pieces of the different single-phase stator elements are then progressively spaced in the same circular formation and the different single-phase coils are energized by currents having the proper phase displacement with respect to the pole piece arrangement to produce a rotating magnetic field at such pole pieces.

The features of my invention which are believed to be novel and patentable will be pointed out in the claims appended hereto. For a better understanding of my invention, reference is made in the following description to the accompanying drawing. Fig. 1 of the drawing shows a cross-sectional view parallel to the axis of rotation of a motor embodying the present invention; Fig. 2 represents a plan view of a portion of the stator poles of the motor of Fig. 1 as these poles would appear if laid out in a plane to illustrate the spacing, polarity, and phase sequence of the different polar projections; Figs. 3 and 4 represent different kinds of stamping which are used in making the stator magnetic circuit of such a motor; Fig. 5 is a diagram of the electrical connections for the split-phase motor represented in Fig. 1; and Fig. 6 is a diagrammatic representation of a three-phase motor stator embodying my invention.

In the motor illustrated in Fig. 1, the stator is supported on an internal sleeve 10, which also serves as a bearing for the rotor shaft 11. The sleeve 10 is secured to a supporting standard 12 shown broken away and the details of which may be varied to suit the application for which the motor is to be used.

Spaced apart along the sleeve are four magnetic stator members 13, 14, 15, and 16. These members may be made of relatively thin sheet steel and may be formed in the proper shape by stamping operations. Each consists of a hub portion 17 fitting sleeve 10 and radially extending finger portions, the ends of which are bent laterally to form the stator pole pieces 19 and 20. The stator members 13 and 16, which are on the outside, have longer fingers 19 than the internal members 14 and 15. The fingers are bent laterally towards the middle to interlace and form a spaced circular series of pole pieces about the center of the stator structure, as represented in Fig. 2. The internal members 14 and 15 may be formed from a stamping such as represented in Fig. 4, while the external members 13 and 16, which require longer fingers, may be formed from a stamping such as represented in Fig. 3. The number of fingers in these different stampings for a given motor is the same and this number will depend upon the desired number of poles in the motor to be constructed. The stampings of Figs. 3 and 4 have six teeth each and are for a twelve pole motor.

Located between stator members 13 and 14 is a magnetic core portion 21, which serves also as a spacer for these members. It may consist of a strip of mild sheet steel wrapped in a spiral about the sleeve 10, thus obtaining the effect of laminations. Closely surrounding the core portion 21 between the members 13 and 14 is a single-phase coil 22. The other stator members 15 and 16 are similarly provided with a core 23 and single-phase coil 24. A spacer, such as a washer 25, is provided between the internal members 14 and 15 and these parts, as thus simply but compactly assembled, may be secured in place and clamped between a flange 26 and a nut 27 on opposite ends of sleeve 10. The members 13 and 14 form side walls for the coil 22 and extend radially beyond the outer diameter thereof and have integral fingers which are bent laterally to form the stator pole pieces of one single-phase stator element.

The parts 13 and 14 with their pole pieces together with the core 21 and coil 22 may be considered as one single-phase stator member with alternate north and south pole pieces, and the corresponding parts on the right of Fig. 1 may be considered as a second similar single-phase stator member with the same number of uniformly and alternately spaced north and south pole pieces. The north and south pole pieces of one of these single-phase stator members are, however, interlaced with the north and south pole pieces of the other stator member in the circular formation represented in Fig. 2. Now, if we energize the two coils 22 and 24 from a single-phase source but produce a phase difference in their currents as by means of a phase-splitting device 28 as represented in Fig. 5, we have provided means for producing a rotating magnetic field about the stator, the two single-phase stator elements constituting different phase elements of the same split-phase motor. Thus, in Fig. 2, I may designate the right-hand motor element as φ1 and the left-hand element as φ2. Considered as a split-phase motor, it has the same number of poles as there are physical pole pieces in one of these single-phase stator members. The phase-splitting condenser may be supported by and occupy the space between the members 14 and 15 if desired. After starting, the condenser winding may be opened if desired. The motor may also be energized from a two-phase source of supply if desired. Likewise, a three-phase motor stator may be built up in this manner, as indicated in Fig. 6, with three single-phase stator members 31, 32, and 33 with their pole pieces interlaced, and having the three single-phase coils indicated simply as lines supplied from a three-phase source 34.

The rotor for such a motor is of the umbrella type supported on the shaft 11, see Fig. 1, and consists of the spider 29 and an element 30 supported thereby closely surrounding and influenced by the rotating magnetic field produced at the interlaced pole pieces of the stator. The secondary element 30 may be of any suitable type depending on the motor characteristics desired.

In the illustration, the rotor element 30 is represented as a hysteresis secondary consisting of a laminated ring of hardened steel. It will then have both starting and synchronous torques. With such a secondary, the spider 29 will preferably be made of nonmagnetic material so as to confine the fluxes acting on the rotor to the hysteresis material. It will also be preferable to make the sleeve 10 and shaft 11 of nonmagnetic material, thereby more completely confining the fluxes to the desired magnetic stator pole piece paths. It is seen that the magnetic circuits of the different stator elements are magnetically independent or segregated. The shape, size, and spacing of the stator teeth and the magnitude of the air gap may be made somewhat different from the illustration without departing from the invention. The phase rotation and direction of rotation of the motor may be reversed as is usual with polyphase motors.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. An alternating-current motor comprising two magnetically independent stator magnetic circuits, each having a single-phase energizing coil and each having a plurality of pole pieces of opposite magnetic polarity uniformly and alternately spaced in a circular formation with the pole pieces of one magnetic circuit lying between the pole pieces of the other magnetic circuit in said circular formation, means for energizing said coils with out-of-phase alternating currents of the same frequency, and a rotor influenced by the combined field from said pole pieces.

2. An alternating-current motor comprising a plurality of magnetically independent stator magnetic circuits, a single-phase coil for energizing each of said magnetic circuits, each of said magnetic circuits having a plurality of pole pieces of opposite magnetic polarity uniformly and alternately spaced in a circular formation and with the pole pieces of the different magnetic circuits progressively spaced in said circular formation, means for energizing said coils by alternating currents of the same frequency but differing in phase such as to produce a rotating magnetic field at the pole pieces, and a rotor influenced by such rotating magnetic field.

3. A polyphase alternating-current motor having a stator element made up of a plurality of single-phase stator elements, each having a single-phase energizing coil and a magnetic circuit with a plurality of pole pieces of opposite magnetic polarity, the magnetic circuits of the different stator elements being magnetically segregated, the pole pieces of the different single-phase stator elements being spaced about and interspersed in the same circular formation, means for energizing the different coils by alternating currents of such phase relation that the single-phase fluxes produced at the pole pieces of the individual single-phase stator elements combining to produce a polyphase rotating magnetic field, and a rotor surrounding said circular formation of pole pieces to be acted upon by such rotating magnetic field.

4. An alternating-current motor comprising stator and rotor elements, the stator element comprising a plurality of axially-spaced single-phase coils wound about the axis of rotation of the motor, separate magnetic circuits for each coil comprising a central core portion and portions extending therefrom radially outwardly on either side of and beyond the outer diameter of the coils, the portions of said magnetic circuits of each coil which extend beyond the outer diameters thereof having finger portions which extend laterally, the finger portions of the different magnetic circuits interleaving to form a circular series of spaced pole pieces, means for energizing said coils from the same source of alternating current but with currents which differ in phase to produce a rotating magnetic field by the combined action of the fluxes produced at all of said pole pieces, and a rotor closely surrounding said circular series of pole pieces so as to be influenced by such rotating magnetic field.

5. A multipolar split-phase motor comprising rotor and stator members, the stator member comprising a pair of single-phase coils, separate magnetic circuits for each coil, each of said magnetic circuits having a plurality of pole pieces of opposite magnetic polarity, the pole pieces of both magnetic circuits being alternately spaced in a common circular formation, a magnetic pole of the stator being produced by adjacent pole pieces of the same polarity belonging to the different magnetic circuits, means for energizing said coils in parallel from a common source of alternating-current supply, means for causing the phase of the current in one coil to differ by a substantial angle from the phase of the current in the other coil, and a rotor influenced by the resultant field produced at all of said pole pieces.

6. A multipolar split-phase motor comprising stator and rotor elements, the stator element comprising a hollow supporting sleeve, a pair of single-phase coils spaced apart and supported by said sleeve with their axes coaxial therewith, magnetic core members for said coils consisting of ribbons of magnetic material wound about said sleeve within said coils, magnetic members extending radially outwardly from said sleeve on opposite sides of each core, forming side walls for the coils, and having uniformly spaced integral finger portions extending beyond the outer diameters of the coils, the finger portions on all of said members having end portions which extend laterally in intermeshed spaced relation to form a circular series of pole pieces coaxial with said sleeve, means for securing said parts on said sleeve, means for energizing said coils with out-of-phase alternating currents of the same frequency, the arrangement of pole pieces and manner of energizing said coils being such as to produce a resultant rotating magnetic field at the pole pieces, and a rotor for said motor comprising a shaft extending into said sleeve, and an umbrella shaped spider extending from said shaft to the vicinity of said pole pieces and provided with a secondary within the influence of the rotating magnetic field.

WAYNE J. MORRILL.